United States Patent
Lee et al.

(10) Patent No.: US 9,923,283 B2
(45) Date of Patent: Mar. 20, 2018

(54) METHOD AND APPARATUS FOR FORMING BEAM IN ANTENNA ARRAY

(71) Applicant: LG ELECTRONICS INC., Seoul (KR)

(72) Inventors: Kyunghaeng Lee, Seoul (KR); Sungho Park, Seoul (KR); Soocheol Kyeong, Seoul (KR); Jiwon Kang, Seoul (KR); Hyunsoo Ko, Seoul (KR); Sunam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 311 days.

(21) Appl. No.: 14/890,402

(22) PCT Filed: Dec. 23, 2013

(86) PCT No.: PCT/KR2013/012046
§ 371 (c)(1),
(2) Date: Nov. 10, 2015

(87) PCT Pub. No.: WO2014/204070
PCT Pub. Date: Dec. 24, 2014

(65) Prior Publication Data
US 2016/0087349 A1    Mar. 24, 2016

Related U.S. Application Data

(60) Provisional application No. 61/836,666, filed on Jun. 19, 2013.

(51) Int. Cl.
*H01Q 3/00*   (2006.01)
*H01Q 21/30*  (2006.01)
(Continued)

(52) U.S. Cl.
CPC ........... *H01Q 21/30* (2013.01); *H01Q 1/246* (2013.01); *H01Q 3/26* (2013.01); *H01Q 5/42* (2015.01);
(Continued)

(58) Field of Classification Search
CPC ................................. H01Q 3/26; H01Q 3/40
(Continued)

(56) References Cited

U.S. PATENT DOCUMENTS 3,878,520 A * 4/1975 Wright ................. H01Q 3/2676
342/368
6,175,333 B1   1/2001 Smith et al.
(Continued)

FOREIGN PATENT DOCUMENTS

| KR | 10-2001-0107712 | 12/2001 |
| KR | 10-2005-0084836 | 8/2005 |
| KR | 10-0894909 | 4/2009 |

OTHER PUBLICATIONS

PCT International Application No. PCT/KR2013/012046, Written Opinion of the International Searching Authority dated Mar. 31, 2014, 1 page.

*Primary Examiner* — Dao L Phan
(74) *Attorney, Agent, or Firm* — Lee, Hong, Degerman, Kang & Waimey PC

(57) ABSTRACT

A method and an apparatus for forming a beam in an antenna array are disclosed. The method for forming a beam in an antenna array comprises the steps of: forming a first beam pattern in a first band on the basis of a single-band antenna aggregation and a multi-band antenna aggregation; and forming other beam patterns in bands other than the first band on the basis of the multi-band antenna aggregation, wherein the single-band antenna aggregation includes a plurality of single-band antennas which operate only in the first band, the multi-band antenna aggregation includes
(Continued)

multi-band antennas which operate in a plurality of bands including the first band, and the antenna array may be arranged in a two-dimensional plane such that distances between the plurality of single-band antennas and the plurality of multi-band antennas are constant.

10 Claims, 15 Drawing Sheets

(51) Int. Cl.
*H01Q 1/24* (2006.01)
*H01Q 3/26* (2006.01)
*H01Q 21/06* (2006.01)
*H01Q 5/42* (2015.01)
*H04B 7/06* (2006.01)
*H04B 7/10* (2017.01)

(52) U.S. Cl.
CPC ......... *H01Q 21/061* (2013.01); *H04B 7/0617* (2013.01); *H04B 7/10* (2013.01)

(58) Field of Classification Search
USPC ........... 342/81, 154, 368, 373; 343/757, 810
See application file for complete search history.

(56) References Cited

U.S. PATENT DOCUMENTS

| | | | | |
|---|---|---|---|---|
| 7,813,700 | B2* | 10/2010 | Zheng | H04B 7/18563 455/12.1 |
| 2002/0158801 | A1* | 10/2002 | Crilly, Jr. | G01S 13/74 342/378 |
| 2012/0280880 | A1 | 11/2012 | Arvidsson et al. | |
| 2013/0328723 | A1* | 12/2013 | Rappaport | H04B 1/3838 342/372 |
| 2015/0326297 | A1* | 11/2015 | Petersson | H04B 7/0617 370/329 |

* cited by examiner

METHOD AND APPARATUS FOR FORMING BEAM IN ANTENNA ARRAY

CROSS-REFERENCE TO RELATED APPLICATIONS

This application is the National Stage filing under 35 U.S.C. 371 of International Application No. PCT/KR2013/012046, filed on Dec. 23, 2013, which claims the benefit of U.S. Provisional Application No. 61/836,666, filed on Jun. 19, 2013, the contents of which are all hereby incorporated by reference herein in their entirety.

BACKGROUND OF THE INVENTION

Field of the Invention

The present invention relates to an antenna array, and more particularly, to a method of beamforming in the antenna array.

Related Art

With an increase in demands for the next generation mobile communications and high-capacity data communications, high-quality high-speed multimedia communication services are gradually needed. In particular, the next generation mobile communication system aims to provide a high-speed link service between a base station and a plurality of users. As demands for the development of digital multimedia technologies and high-speed wireless transmission increase, attempts to realize Gigabits per second (Gbps) wireless transmission in indoor and outdoor short-distance high-speed wireless data communications are proceeding in global technology developed countries. This means that beam forming systems tracking desired signals at high speed and having a higher gain between communications are gradually being required.

Beamforming is an antenna technology, in which energy radiated by antennas is concentrated in a certain direction on a space. The purpose of beamforming is to receive stronger signals in a desired direction or transfer signals with more focused energy in a desired direction. In particular, the beamforming systems are required to realize various types of beams with a higher gain for manufacturing high-speed and high-capacity wireless communication systems.

For example, the beamforming systems may be used in communications in a higher path loss band, such as high-speed mass data communications, various kinds of A method and an apparatus for forming a beam in an antenna array are disclosed. The method for forming a beam in an aeronautical satellite communications where smart antennas are used in satellites, aircrafts, or the like, for a plurality of users, etc. Therefore, beamforming communications are being studied in various fields, such as the next generation mobile communications, various kinds of radar, military and aerospace communications, indoor and inter-building high-speed data communications, Wireless Local Area Network (WLAN), Wireless Personal Area Network (WPAN), etc.

SUMMARY OF THE INVENTION

The present invention provides a method of controlling a beam width for each band in an antenna array.

The present invention also provides an antenna array for controlling a beam width for each band.

According to one aspect of the present invention, there is provided a method of beamforming in an antenna array. The method includes: forming a first beam pattern on the basis of a single-band antenna set and a multi-band antenna set at a first band; and forming a different beam pattern on the basis of the multi-band antenna set at a different band other than the first band, wherein the single-band antenna set comprises a plurality of single-band antennas operating only at the first band, wherein the multi-band antenna set comprises a plurality of multi-band antennas operating at a plurality of bands comprising the first band, and wherein the antenna array is arrayed in a 2 dimensional (2D) plane while maintaining a uniform distance between the plurality of single-band antennas and the plurality of multi-band antennas.

According to another aspect of the present invention, there is provided a base station operating in a wireless communication network. The base station includes: a radio frequency (RF) unit for transmitting and receiving a radio signal; and a processor selectively coupled to the RF unit, wherein the processor is configured for: forming a first beam pattern on the basis of a single-band antenna set and a multi-band antenna set at a first band; and forming a different beam pattern on the basis of the multi-band antenna set at a different band other than the first band, wherein the single-band antenna set comprises a plurality of single-band antennas operating only at the first band, wherein the multi-band antenna set comprises a plurality of multi-band antennas operating at a plurality of bands comprising the first band, and wherein the antenna array is arrayed in a 2D plane while maintaining a uniform distance between the plurality of single-band antennas and the plurality of multi-band antennas.

Since a beam having a different beam width is radiated for each band in an antenna array having a plurality of operating frequency bands, not only an inter-cell interference caused by 3 dimension (3D) beamforming but also a performance deterioration phenomenon caused by an interference generated with other user equipments (UEs) can be overcome, and a phenomenon in which the UE becomes a null state can also be overcome. In addition, a beam width of a specific band is increased to implement an antenna array in such a manner that a UE and a base station (BS) can effectively establish a link in a line of sight (LOS) environment or other non-line of sight (NLOS) environments.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

An antenna array has a shape in which several physical antennas are gathered. To obtain a directional radiation pattern, the antennas may be disposed on space, and many compact antennas may be used in the array. An array antenna which is implemented on the basis of the plurality of compact antennas can solve a mechanical problem occurring in a uniform large antenna as an electrical problem of feeding power to the compact antenna.

Figure 1:
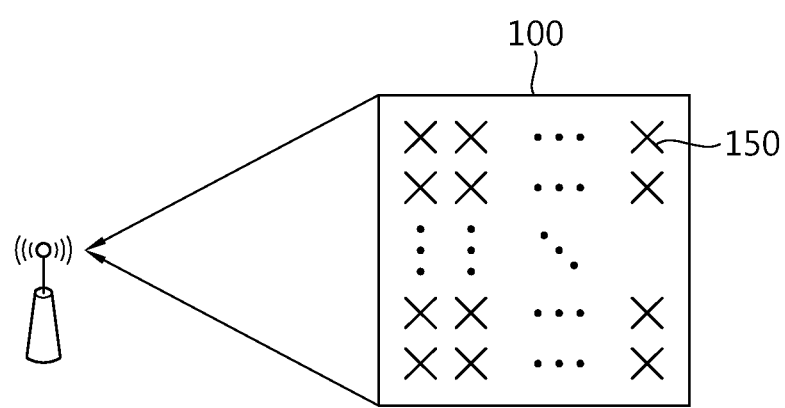
FIG. 1 shows the concept of a structure of an antenna array included in the legacy BS/UE.

FIG. 1 shows the concept of a structure of an antenna array included in the legacy BS/UE.

An antenna shape or a structure of an antenna array 100 included in the legacy BS/UE uses a uniform linear array (ULA) scheme in general. The ULA may have a shape in which antennas are arrayed in a linear array structure while uniformly maintaining an interval between an antenna having the same resonant frequency and each uniform antenna 150. In general, an array may be constructed of identical components arrayed regularly, and may have a structure in which the plurality of antennas 150 are uniformly disposed on space such that the plurality of antennas 150 have access to each other to obtain a directional radiation pattern. In a mobile communication system, a technique of performing modem signal processing by using the plurality of antennas 150 is called a multi-antenna (or antenna array) communication technique. Performance of the antenna array 100 may be determined according to an operating characteristic and type of the uniform antenna 150 constituting the antenna array 100, and an operating band and characteristic of the antenna array 100 may be determined according to a resonant frequency, electric current distribution, and radiation pattern on which the uniform antenna 150 operates. Equation 1 below expresses an electric field characteristic of the antenna array 100.

$$E_t = \hat{a}_\theta j\eta \frac{kI_0 le^{-jkr}}{4\pi r} \cos\theta\{1 + e^{j(kd\cos\theta+\beta)}\}$$

$$= \hat{a}_\theta j\eta \frac{kI_0 le^{-jkr}}{4\pi r} \cos\theta \cdot 2e^{j(kd\cos\theta+\beta)/2} \cos\left[\frac{1}{2}(kd\cos\theta+\beta)\right]$$

(Equation 1)

In Equation 1, a θ may denote array feed coefficients, η may denote an intrinsic impedance, r may denote a transmit/receive distance, Et may denote a total electric radiated field, k may denote a Boltzmann constant value, Io may denote an amplitude excitation of the antenna element, B may denote a reference to the central point of the array (excitation phase), and d may denote a distance between antennas. That is, referring to Equation 1, the characteristic of the antenna array 100 is determined according to a characteristic of the uniform antenna constituting the antenna array 100, the number of antenna arrays, an interval between antennas, etc.

Equation 1 expressing a total electric field generated in the antenna array 100 may be expressed by a product of an array factor (AF) and an element factor of the uniform antenna 150. The element factor of the uniform antenna 150 may be characteristic information of the uniform antenna 150. If an antenna included in an array is coupled, the AF may be an element for determining information regarding a total radiation beam pattern radiated from the antenna array 100.

That is, if the plurality of identical antennas 150 constitute the antenna array 100 as a uniform array, the total electric field of the antenna array 100 may be determined on the basis of the AF and the electric field of the uniform antenna 150 located at a starting point. Therefore, the total electric field of the antenna array 100 may be determined depending on the number of antennas and the characteristic of each individual uniform antenna 150.

The radiation pattern of the antenna array 100 may be determined according to a shape of each of individual antennas, a direction thereof, a location on space, and a magnitude and phase of electric current for supplying power, and a beam width to be radiated is dependent on the number of uniform antennas 150. The greater the number of uniform antennas, the sharper the beam steering and the beam width. Therefore, beamforming may be sharper when using a great number of uniform antennas 150 having the same shape and characteristic. A beam having a very narrow beam width is called a pencil beam. As shown in FIG. 1, in the legacy cellular system, the BS/UE may use the antenna array 100 having the ULA structure, and the plurality of uniform antennas 150 having the same characteristic may be arrayed to have the same radiation beam pattern at all mobile communication service bands.

With a distribution of a wireless communication device and an increase in services using a wireless communication technique in various fields, there is a high demand for antennas of various shapes. The antenna can operate only when it is designed according to a wireless communication service band to be used. In order to adjust an operating band, a resonance must be achieved so that the antenna can transmit/receive data at a specific frequency band.

Figure 2:
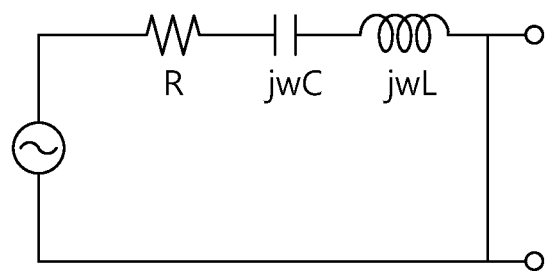
FIG. 2 shows the concept of an antenna resonant circuit.
Figure 2:
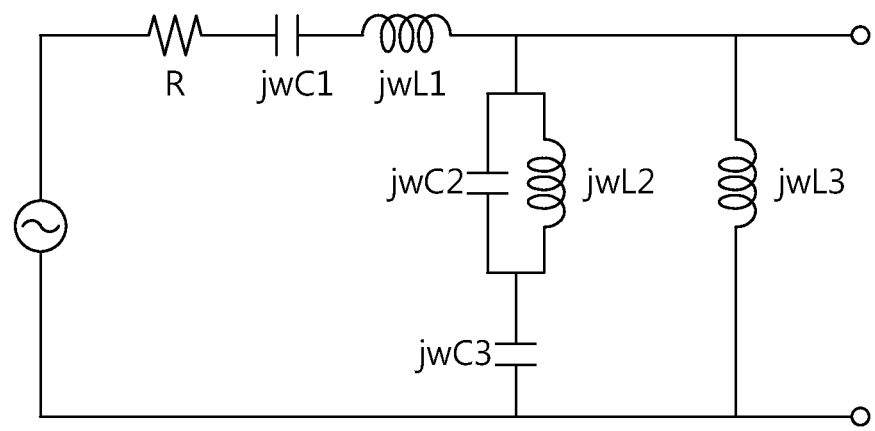

FIG. 2 shows the concept of an antenna resonant circuit.

An upper side of FIG. 2 shows a $1^{st}$ order resonant equivalent circuit of an antenna operating at a single band.

The $1^{st}$ order resonant equivalent circuit of the antenna operates at the single band by the use of an inductor and a capacitor which are reactance components, and a radiation pattern may be independent according to a designed antenna type. There is a need to satisfy a request of a rapidly growing wireless communication service network, but the single band fails to overcome a shortcoming of a narrow operating band and a difficulty in an ultra wide band (UWB) design. In order to overcome the shortcoming of the single-band antenna, a multi-band antenna has been developed. In case of an antenna used in the legacy BS, a gradual increase in a service band leads to an increase in an operating band required in the antenna, and leads to a use of a multi-band antenna having a plurality of operating bands of the antenna.

A lower side of FIG. 2 shows an n-th order resonant circuit. The multi-band antenna is an antenna which resonates at a plurality of bands. The multi-band antenna may be constructed by mixing a plurality of antennas having a half wavelength in general. A reactance component causing a resonance may be implemented on the basis of a combination of transmission lines. The multi-band antenna may be implemented by mixing various types of antennas or by combining the transmission lines or by using a meander-type antenna. An antenna radiation pattern varies depending on a designed antenna shape. The multi-band antenna is implemented in general with a patch antenna, a planar antenna, a loop antenna, a monopole antenna, a dipole antenna, a meta-material antenna, etc., and is characterized in that a radiation shape thereof commonly has an omni-directional radiation shape.

In case of an antenna operating at multiple bands used in the BS, an antenna array structure can be implemented in which beamforming is possible by arraying a plurality of antennas having an omni-directional characteristic.

Figure 3:
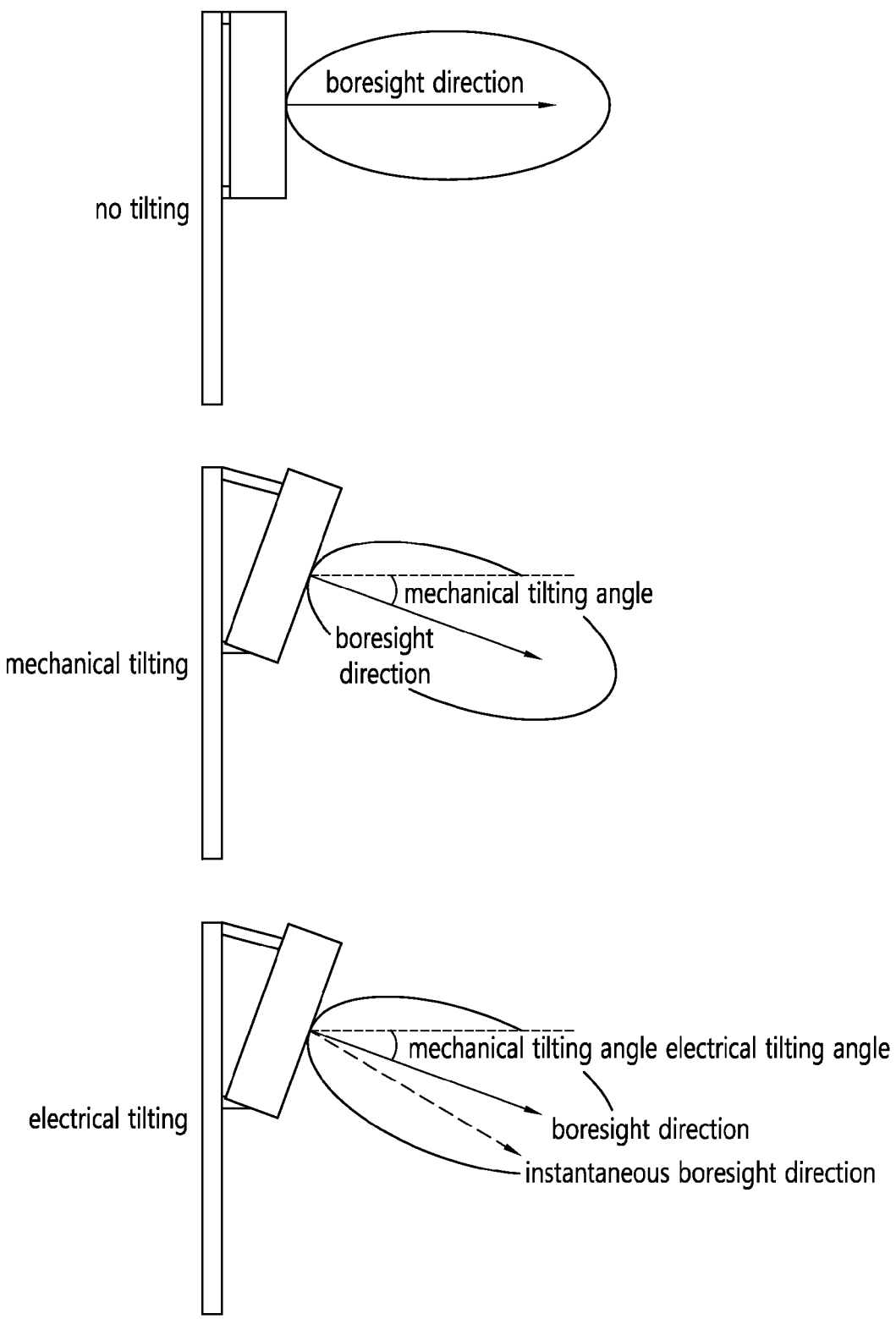
FIG. 3 is a schematic view illustrating an antenna tilting method.

FIG. 3 is a schematic view illustrating an antenna tilting method.

The top of FIG. 3 illustrates a case that antenna tilting is not performed, the middle of FIG. 3 shows mechanical tilting, and the bottom of FIG. 2 represents electrical tilting.

Referring to FIG. 3, a conventional cellular system has adopted a method for reducing, by a BS, inter-cell interference based on mechanical tilting or electrical tilting and improving a Signal to Interference-plus-Noise Ratio (SINR) of UEs in the cell. However, in the case of mechanical tilting, there is a disadvantage that the beam direction is fixed in the initial installation and that since a mechanical tilting angle is determined according to the height of a building where the BS is to be installed and the height of a support, a radiation beam width needs to be wider. In the case of electrical tilting, it has a downside in that a tilting angle may be changed by using an internal phase shift module, but only very restrictive vertical beamforming is possible due to actually cell-fixed tilting. When an Active Antenna System (AAS) is employed, free horizontal beamforming and/or vertical beamforming may be implemented, compared with conventional tilting.

Figure 4:
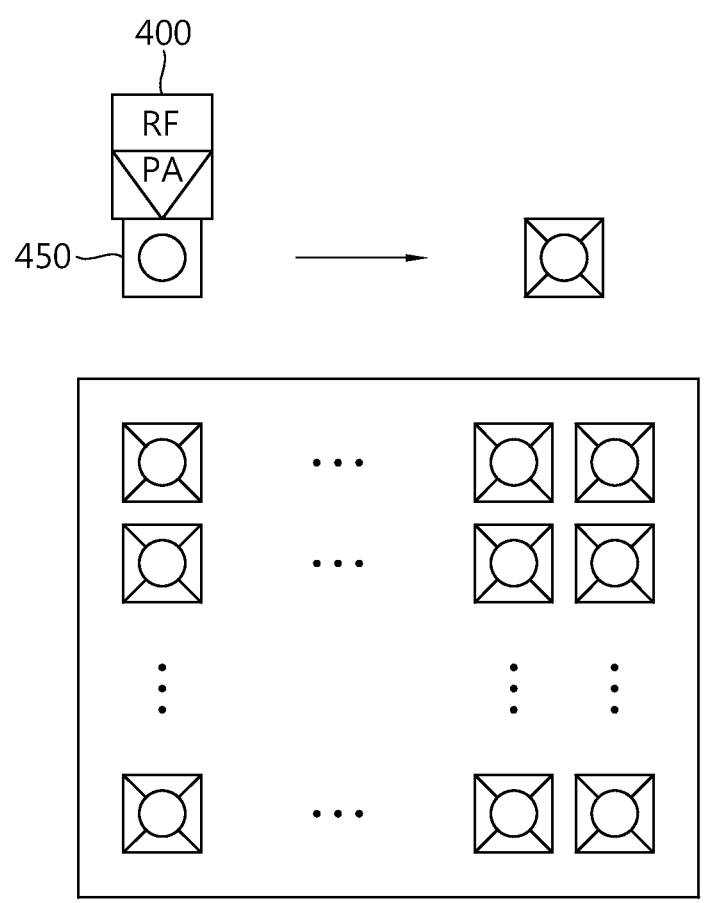
FIG. 4 is a schematic view illustrating an AAS.

FIG. 4 is a schematic view illustrating an AAS.

Referring to the top of FIG. 4, the AAS is realized in the form of coupling a Radio Frequency (RF) module 400 to each antenna that is a passive device unlike a conventional passive antenna system.

The AAS includes the RF module 400, i.e. an active device, in each antenna, adjusting power and phase of each antenna module. The AAS may improve matters related to antenna performance (e.g., an increase in the effective length of a small antenna, an increase in bandwidth, a reduction in a coupling and noise reduction, between array devices, or improved transmission power efficiency), enables high integration in connection with Microwave Integrated Circuit (MIC) and Monolithic Microwave Integrated Circuit (MMIC) technologies and, in particular, may recover a shortcoming caused by a high loss due to a transmission line, limited source power, a reduction in antenna efficiency, or a lack of a phase shifter with excellent performance when applied to millimeter wave band communication systems. Since each antenna is coupled to the RF module 400, each antenna can be controlled per port and adjusted in phase and output to suit communication environments and situations.

Figure 5:
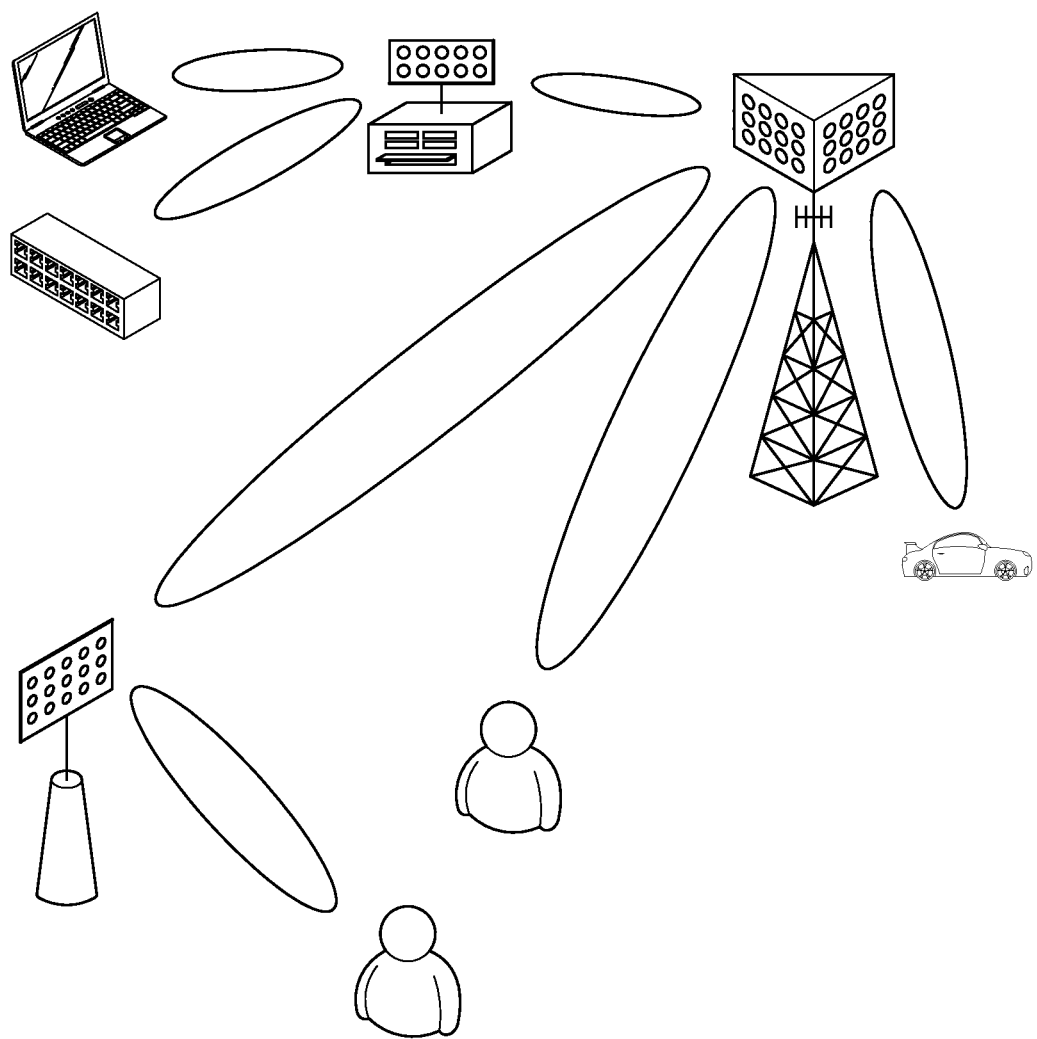
FIG. 5 shows the concept of a 3 dimensional (3D) beamforming method.

FIG. 5 shows the concept of a 3 dimensional (3D) beamforming method.

A linear type array such as a uniform linear array (ULA), i.e., a 1D antenna array, is considered as a multiple input multiple output (MIMO) antenna structure generally considered in the conventional method. Beams that can be generated with beamforming in the 1D antenna array structure may have a pattern in which a radiation is achieved in a 2D plane. In addition, when using the 1D array structure such as the ULA, power energy which is output from the antennas is not converged to one point, and a beam shape is changed depending on an antenna array location, an antenna shape, etc. The ULA structure also applies to a MIMO structure based on a passive antenna system (PAS) of a BS. Although vertical antennas and horizontal antennas exist also in the PAS BS, the vertical antennas coupled to one RF module cannot be subjected to beamforming in a vertical direction, and can be subjected to only the aforementioned mechanical tilting.

With an evolution of an antenna structure of the BS to an AAS, RF modules are independently installed to respective antennas disposed in a vertical direction, which allows the beamforming to be possible not only in a horizontal direction but also in the vertical direction. The vertical direction beamforming is also called elevating beamforming.

Referring to FIG. 5, in the 3D beamforming, as beamforming allowing the elevation beamforming, a beam can be radiated to 3D space corresponding to the vertical direction and the horizontal direction. The 3D beamforming may be possible when a 1D antenna array structure is evolved to a 2D antenna array structure. The antenna array does not necessarily have a planer shape in order to perform the 3D beamforming, but the 2D shape array structure is also possible in a conformal (ring) array shape. It is important in the 3D beamforming that MIMO processing is achieved on the 3D space due to not the conventional linear antenna array but various shapes of the antenna array.

The 3D beamforming may be used in the AAS. Therefore, it is possible to transmit a beam to a UE through beamforming not only for a case where the UE moves to the left or right side of the BS but also a case where the UE moves forwards and backwards. However, a shape of a beam which is output from the BS in which an antenna array is configured with the AAS maintains a half power beam width (HPBW), and an antenna operates precisely with a narrow HPBW. When the antenna operates with the narrow HPBW, a link is not accurately established between the UE and the BE if an LOS environment is not formed between the UE and the BS. Accordingly, there is a disadvantage in that communication is not smoothly achieved.

If a real cell environment is considered when communication is performed on the basis of a 2D antenna array based on an active antenna, there is a need to consider a channel characteristic which is significantly different from the legacy wireless channel environment. For example, transmission based on the 2D antenna array needs to be performed by considering a channel environment characteristic such as a fading property change or the like including a shadow/path loss change depending on a height difference, line of sight (LoS)/non line of sight (NLoS), direction of arrival (DoA), etc.

For example, if transmission using a sharp beam such as pencil beamforming is achieved in an array antenna, there may be a case where 3D beamforming is useful and a case where the 3D beamforming is not useful according to a location of the UE. When performing transmission using the 2D antenna array based on the activate antenna, the UE estimates information on a channel characteristic in a more complex manner. Further, a link complexity between the UE and the BS is increased, and a computation complexity of the UE is increased. In particular, when a scale of the array antenna is increased for sharp beam steering, not only the computation complexity of the UE but also a feedback information amount and an implementation complexity are also increased. Therefore, it is proposed an antenna structure capable of adjusting a beamforming beam width transmitted from the BS in an environment where it is difficult to perform beamforming between the UE and the BS according to an embodiment of the present invention.

As described above, with the development of the AAS, the BS can perform the 3D beamforming, and the shape of the beam radiated from the antenna used in the BS/UE can be sharper according to the growing number of antennas. In addition, since the 3D beamforming is possible due to the introduction of the AAS, an elevation beamforming (or vertical beamforming) operation may be possible. On the basis of the elevation beamforming, the BS may minimize an inter-cell interference by controlling a transmission range in a cell. By adjusting a beam width in the beamforming, the BS/UE may establish a link effectively in a situation where beamforming is not achieved (e.g., a situation where a line of sight (LOS) is not secured, and may perform data transmission and reception. Hereinafter, it is disclosed a change of an antenna array structure and an antenna array operating with a different beam width at a different band in the AAS according to an embodiment of the present invention.

Figure 6:
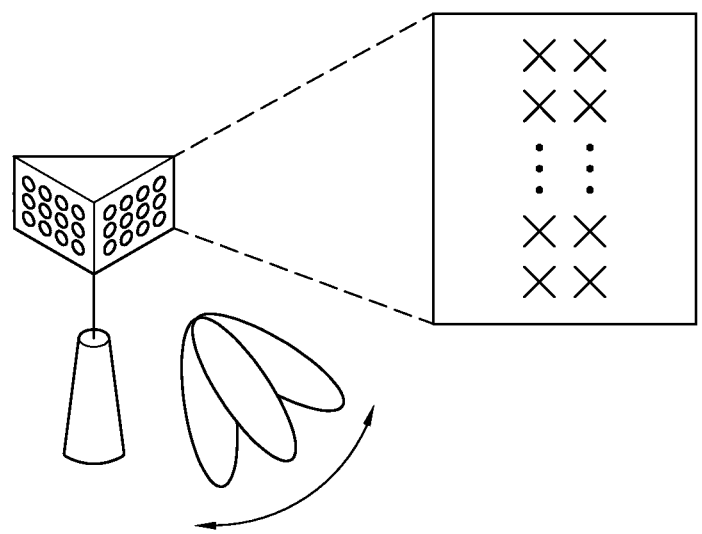
FIG. 6 shows the concept of a beamforming operation of an antenna.
Figure 6:
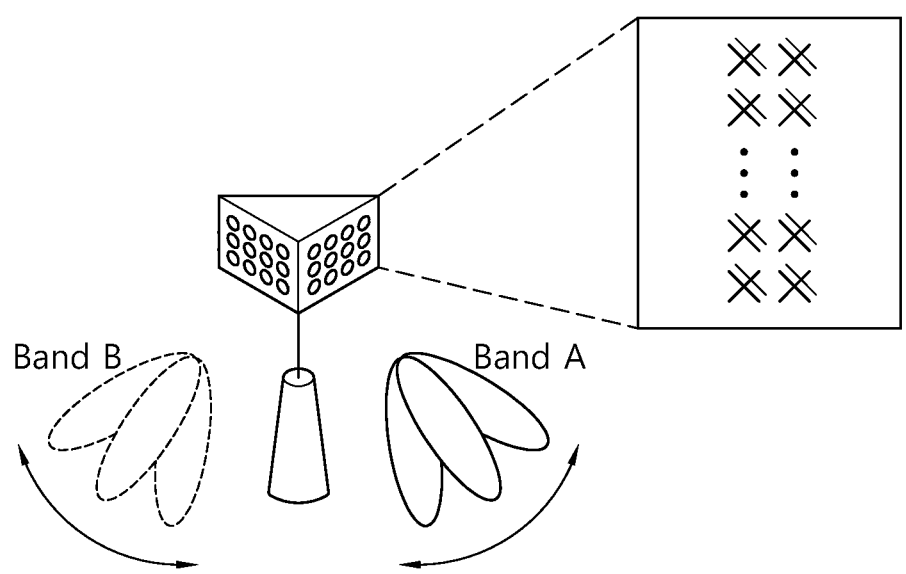

FIG. 6 shows the concept of a beamforming operation of an antenna.

Referring to an upper side of FIG. 6, it is shown a beamforming shape of an antenna array implemented with a plurality of single-band antennas operating at a single band. This is a beam pattern of a radiation beam formed in a BS antenna based on an AAS. An array antenna implemented with the plurality of single-band antennas can perform beamforming, and can perform elevation beamforming (or vertical beamforming) by the use of an RF module constructed of an active component by integrating the AAS.

A lower side of FIG. 6 shows a beamforming shape of an antenna array implemented with a plurality of multi-band antennas operating at multiple bands. The multi-band antenna may perform beamforming on the basis of a beam having the same beam width at each operating band. Since a beam's HPBW and an antenna array's AF are dependent on the number of antennas, the multi-band antenna array is equivalent to an antenna band implemented for each operating band. If an antenna array including a multi-band antenna operates based on the AAS, a characteristic of an AAS system can be used equally for each band.

3D beamforming is a beamforming scheme which is most optimized to an LOS environment. If the number of antennas included in the antenna array is increased and thus the beam's HPBW becomes very narrow, a probability that a UE becomes a null state is increased. If a synchronization is not easily achieved between a BS and the UE and a link is not detected due to inaccuracy of a beam tilting angle, a UE movement, an interference, etc., the UE becomes the null state. In addition, the link may not be established between the BS and the UE due to an environment and an elevation beam control range difference caused by an antenna array structure and size difference and/or a location and altitude difference. Therefore, in a specific case, there is a need to form a beam width to be wide. For example, if the beam width can be adjusted for each band when the BS searches for the UE, when transmission/reception is achieved with a small amount of data, or when the BS and the UE adjust a synchronization, not only an inter-cell interference caused by the 3D beamforming but also a performance deterioration phenomenon caused by an interference generated with other UEs can be overcome, and a phenomenon in which the UE becomes the null state can also be overcome.

Hereinafter, it is proposed a method for solving a phenomenon in which an inter-cell interference caused by 3D beamforming is generated by adjusting a beam width for each band in an antenna array, a phenomenon of performance deterioration caused by an interference generated with other UEs, and a phenomenon in which a UE becomes a null state according to an embodiment of the present invention.

The present invention proposes an antenna array technique capable of adjusting a beam width for each band so that a UE can effectively establish a link with a BS in an LOS environment or other NLOS environments in such a manner that a beam width of a specific band is increased by adjusting a beam width for each band on the basis of a 2D antenna array. By using such a transmission method, an effective and high data transfer rate can be provided.

Figure 7:
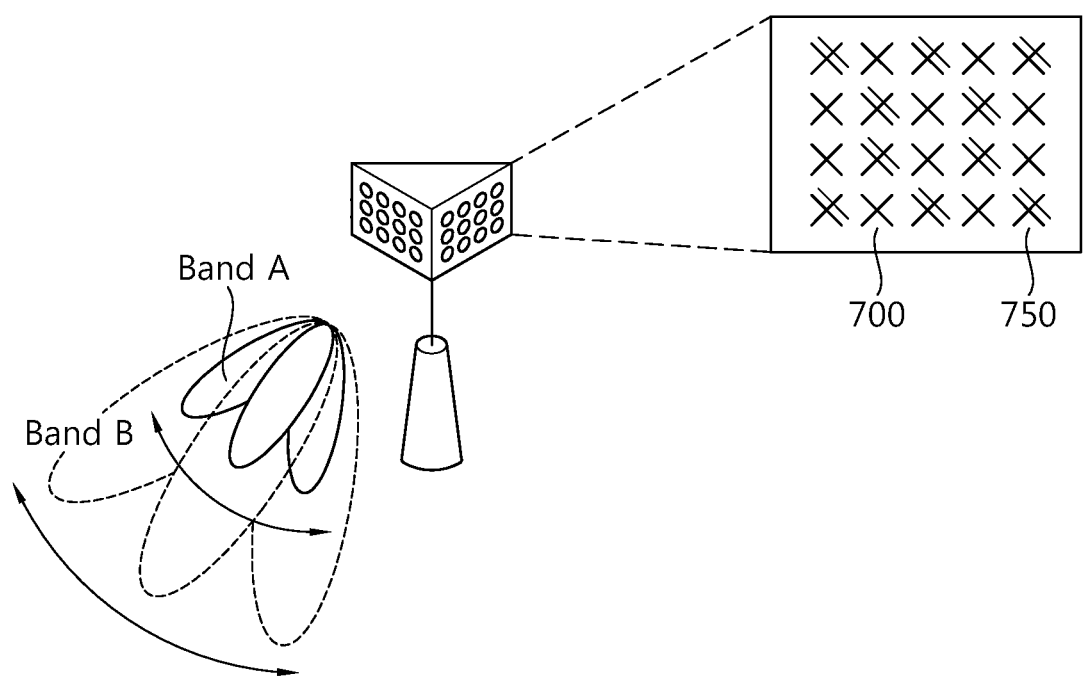
FIG. 7 shows the concept of an antenna array and a beamforming shape according to an embodiment of the present invention.

FIG. 7 shows the concept of an antenna array and a beamforming shape according to an embodiment of the present invention.

Referring to FIG. 7, a BS may adjust a beam width for each band on the basis of an antenna array structure in which a single-band antenna 700 and a multi-band antenna 750 are mixed. For example, the antenna array may include the single-band antenna 700 and the multi-band antenna 750. In this case, a wide beam width may be formed at a specific band. For example, the antenna array may be implemented by using a first antenna 750 and a second antenna 700. The first antenna 750 may be an antenna operating at a band A and a band B, and the second antenna 700 may be an antenna operating at the band B. In this case, a beam corresponding to the band A and formed in the antenna array may have a narrow width, and a beam corresponding to the band B and formed in an array antenna may have a wide width. That is, the antenna array according to the embodiment of the present invention may be implemented such that the antenna array radiates a beam with a different beam width for each band.

Although beamforming performed in the BS is assumed in FIG. 7, the beamforming may also be performed in the UE. That is, the BS and/or the UE may adjust a beam width for each band on the basis of an antenna array structure in which a single-band antenna and a multi-band antenna are mixed.

Figure 8:
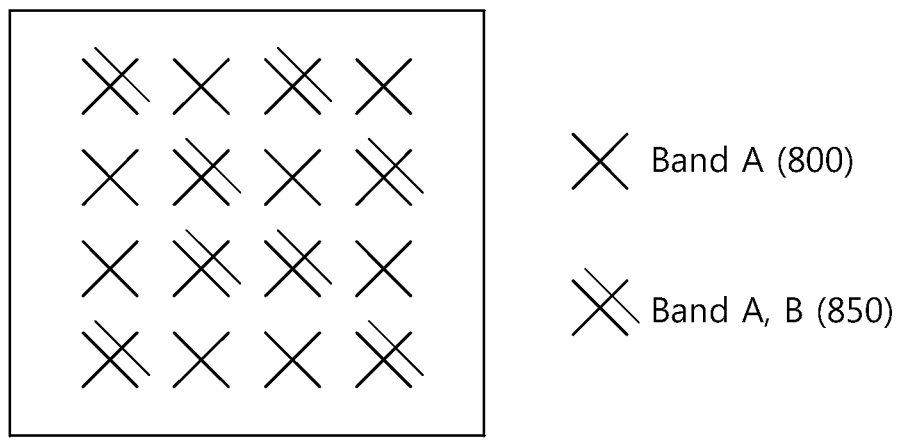
FIG. 8 shows the concept of an array of antennas in an antenna array according to an embodiment of the present invention.

FIG. 8 shows the concept of an array of antennas in an antenna array according to an embodiment of the present invention.

Referring to FIG. 8, the antenna array may be implemented with 16 antennas based on a ULA structure by mixing a plurality of (e.g., 8) single-band antennas 800 and a plurality of (e.g., 8) multi-band antennas 850.

The antenna array may be implemented by mixing the single-band antenna 800 and the multi-band antenna 850, thereby adjusting a beam width for a specific band. The multi-band antenna 850 may be an antenna of the same type as the single-band antenna 800. For example, if a patch antenna is used as the single-band antenna 800, the multi-band antenna 850 operating at multiple bands may also use the patch antenna having the same characteristic to implement the antenna array. That is, as an antenna of the same type as the single-band antenna 800, the multi-band antenna 850 may be an antenna operating also at a band which is the same as the band at which the single-band antenna 800 operates.

If an operating frequency band of the single-band antenna 800 is a band A, the single-band antenna 800 may be a resonant-type antenna constructed of a reactance component operating at the band A. If the operating frequency of the multi-band antenna 850 is the band A and a band B, the multi-band antenna 850 may be a $2^{nd}$-order resonant-type antenna having a reactance component operating at the band A and a reactance component operating at the band B.

First, from the perspective of the band A, both of the multi-band antenna 850 and the single-band antenna 800 are antennas operating at the band A. Therefore, the antenna array may be assumed as an antenna array in which the single-band antenna 800 and the multi-band antenna 850 are constructed of the same-sized reactance component and which includes 16 antennas operating at the band A. If the multi-band antenna 850 and multi-band antenna 800 included in the antenna array have different operating bands and different antenna types, an antenna characteristic is changed and thus beamforming is not achieved as in the antenna array. However, if the single-band antenna 800 and the multi-band antenna 850 have the same type and operate at the same band, a beamforming operation such as legacy 3D beamforming is possible, and a characteristic change caused by the multi-band antenna 850 is not significant. This is because, if the antennas have the same type and operate at the same band, since a resonant frequency is identical and a reactance component causing a resonance of the antenna is identical, a characteristic impedance value is identical, thereby decreasing a coupling influence generated between the antennas. In this case, since the band B of the multi-band antenna 850 is constructed of a reactance component different from that of the band A, a signal of the band A does not pass but acts as a resistance component causing a power loss.

Next, from the perspective of the band B, among the 16 antennas included in the antenna array, the 8 multi-band antennas 850 operating at not only the band A but also the band B may form a radiation pattern also at the band B. In the embodiment of the present invention, an antenna may be implemented to form a wide radiation beam at a specific band such as the band B, so that a BS and a UE can rapidly establish a link. In order to form a wide radiation beam formed at the specific band in the antenna array, a distance between antennas operating at the specific band (i.e., an antenna space, physical distance between antennas), the number of antennas, etc., may be determined.

The distance between the antennas included in the antenna array is a very important element to determine a characteristic of the antenna array. In particular, in a structure in which a plurality of antennas are arrayed such as in the antenna array, the characteristic of the antenna array is determined by the distance between the antennas. Examples of an element for determining a radiation pattern in the antenna array may include a shape of each antenna element, a direction of each antenna element, a location (interval) of antenna elements on space, a magnitude and phase of electric current for power feeding to an antenna component, etc. In the embodiment of the present invention, a beam formed when the antenna array operates at a specific band may be formed to have a wide width on the basis of the location of antenna elements on space (i.e., a distance between antennas) and a magnitude and phase of electric current for power feeding to the antenna element.

The distance between antennas may indicate an interval between respective antennas included in the antenna array. In the antenna array, the distance between antennas may determine a significant part of performance of the antenna array to be designed. Various beam patterns may be generated in the antenna array on the basis of the distance between antennas. In the antenna array, a beam width may be determined by the distance between antennas included in the antenna array. Hereinafter, a characteristic of a beam (e.g., a beam width) determined by the distance between antennas included in the antenna array is disclosed in detail.

Equation 2 below expresses an AF of the antenna array. The AF may be an element for determining information on a total radiation pattern radiated in the antenna array when combining antennas included in an array.

$$AF = I_0 + I_1 e^{jBd\cos\Theta} + I_2 e^{jB2d\cos\Theta} + \ldots = \sum_{n=0}^{N-1} I_n e^{jBnd\cos\Theta} \quad \langle \text{Equation 2} \rangle$$

In Equation 2, I denotes a size of electric current delivered by a transmission path of an antenna, and $e^{jbd\,\cos\,\theta}$ denotes a phase and interval between antennas. N denotes the number of antenna arrays.

Equation 3 below expresses a calculation result obtained by normalizing the AF.

$$AF = \sum_{n=0}^{N-1} e^{jn\psi} = 1 + e^{j\psi} + e^{j2\psi} + \ldots + e^{j(N-1)\psi} \quad \langle \text{Equation 3} \rangle$$

$$e^{j\psi} AF = e^{j\psi} + e^{j2\psi} + \ldots + e^{j(N-1)\psi} + e^{jN\psi}$$

Difference is obtained as:

$$(1 - e^{j\psi})AF = 1 - e^{jN\psi} \Rightarrow AF = \frac{1 - e^{jN\psi}}{1 - e^{j\psi}}$$

$$AF = \frac{e^{jN\psi/2}}{e^{j\psi/2}} \frac{e^{jN\psi/2} - e^{-jN\psi/2}}{e^{j\psi/2} - e^{-j\psi/2}} = e^{j(N-1)\psi/2} \frac{\sin(N\psi/2)}{\sin(\psi/2)}$$

A value which maximizes the AF value on the basis of Equation 3 may be a value as shown in Equation 4 below.

$$\frac{\psi}{2} = \frac{1}{2}(kd\cos\theta + \beta)\bigg|_{\theta=\theta_m} = \quad \langle \text{Equation 4} \rangle$$

$$\pm m\pi \Rightarrow \theta_m = \cos^{-1}\left[\frac{\lambda}{2\pi d}(-\beta \pm 2m\pi)\right] m = 0, 1, 2, \ldots$$

$$\theta_{max} = \cos^{-1}\left(\frac{\lambda\beta}{2\pi d}\right)$$

In Equation 4, β denotes a phase difference, d denotes an interval, and λ denotes a wavelength. That is, in order to maximize the AF, there is a need to adjust values of λ, β, d. In the antenna array, λ is fixed and thus is not variable. Further, since a beam is steered in a specific direction by using a phase, β is also a parameter which is not variable in practice. Therefore, a beam width formed by the antenna array may be changed on the basis of d, i.e., the antenna interval. That is, according to the embodiment of the present invention, the AF can be varied by regulating an interval of antennas included in the antenna array operating at a specific band, and thus a beam width of the antenna array formed at the specific band in the antenna can be varied.

Alternatively, referring to Equation 2, the AF value may be varied also when the number of antennas operating at the specific band is varied. If the number of antennas operating at the specific band among the antennas included in the antenna array becomes significantly small, the AF value may become small at a band at which a relatively small number of antennas operate. A beam width at the specific band may become wide according to the AF value. This will be described below in detail.

If an active antenna structure is used also in a case where the AF becomes small at the specific band, the decreased AF value may be compensated for by using a power amplifier module (PAM) for a value $I_o$ applied to each antenna operating at the band. Therefore, in the embodiment of the present invention, a gain decrease can be compensated for by using an AAS while differently forming a size of a beam width for each band.

Returning to FIG. 8, the structure of the antenna array for forming the band width which is wider at the specific band (e.g., B band) than the band A may be determined according to the number of antennas and/or an interval of antennas operating at the specific band. Since both of the single-band antenna 800 and the multi-band antenna 850 operate at the band A, the antenna arrays 800 and 850 operating at the band A may have a uniform antenna interval. Therefore, the AF value may be transmitted as a maximum value. On the contrary, at the band B, only the multi-band antenna 850 may operate, and an interval between antennas included in the antenna array may be irregular and may have a great value. For this reason, in case of the multi-band antenna 850 operating at the band B as described above, it is possible to form a beam width which is wider than a beam width formed at the band A since an interval between the multi-band antennas 850 is not uniform and thus output energy is not converged to a specific point which is an advantage of the antenna array.

A change of a beam width generated at each band by the antenna array is described below in detail.

An HPBW may be used as a variable for indicating a radiation characteristic of the antenna array. The HPBW indicates an angle between two points at which radiation strength is halved on a plane including a maximum direction of a beam. The HPBW has a sharp shape when many antennas are used. For example, in case of using a structure having hundreds of antennas such as massive MIMO, pin point beamforming may be performed. The beam width formed by changing the HPBW may be determined by adjusting the number of antennas used at a specific band of the antenna array.

Equation 5 below is an equation used in general when the HPBW is obtained.

$$\Delta \phi_{3dB} = 0.886 \times \frac{\lambda}{Nd} \quad \langle \text{Equation 5} \rangle$$

In Equation 5, the HPBW may be determined by the number N of antennas and an antenna separation distance d. As can be seen in Equation 5, if it is assumed that the antenna separation distance is uniform, an element capable of varying the HPBW of the antenna is the number of antennas. In case of an antenna array method according to the embodiment of the present invention, since the number N of antennas and the antenna separation distance d differ for each operating band, the HPBW may have a different value for each case.

In case of FIG. 8, all of 16 antennas operate at the band B. Therefore, at the band A, since an antenna structure has a ULA structure, N=16, and the antenna separation distance d has a constant value. On the contrary, at the band B, 10 antennas operate. In addition, the antenna separation distance d has a great and irregular value in comparison with the band A.

Table 1 below shows a value obtained by calculating the HPBW which can be formed in the antenna array.

TABLE 1

| N(the number of antennas) | d(antenna space) | $\varphi_{3\ dB}$(HPBW) |
|---|---|---|
| 16 | 0.5λ | 0.11 |
| 10 | λ | 0.88 |
| 6 | 1.5λ | 1 |

Referring to Table 1, the HPBW may have a different value depending on the number N of antennas and the antenna separation distance d in the antenna array. The greater the number of antennas or the smaller the antenna interval, the greater the HPBW and the greater the beam width to be formed. That is, if a multi-band antenna is randomly arrayed as shown in the band B of FIG. 8, the AF has a small value and thus a characteristic of the antenna array is decreased and a radiation beam having a wide HPBW may be formed.

Further, in the AAS system according to the embodiment of the present invention, an interference caused by a single-band antenna operating only at the band A can be minimized by regulating output power and phase of an antenna operating at the band B. Furthermore, since operating bands are different, wireless transmission and reception at the band A may perform beamforming while an operation of forming a wide radiation beam may be performed at the band B.

Figure 9:
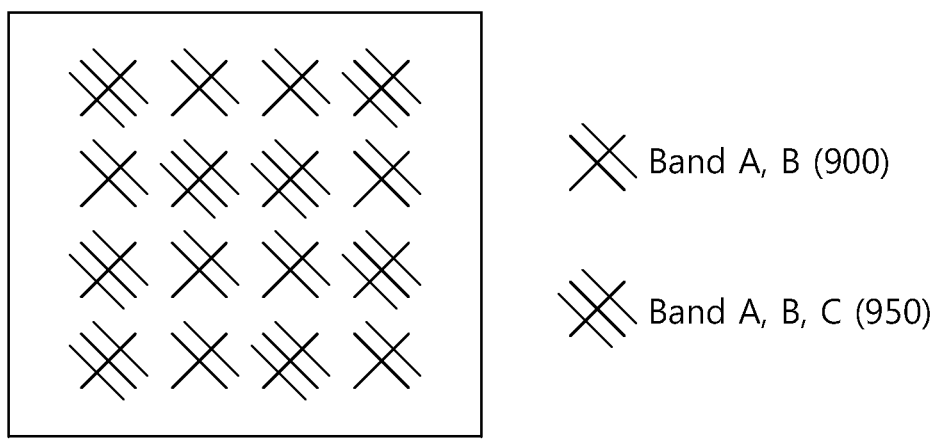
FIG. 9 shows the concept of an array of antennas in an antenna array according to an embodiment of the present invention.

FIG. 9 shows the concept of an array of antennas in an antenna array according to an embodiment of the present invention.

Referring to an upper side of FIG. 9, it is shown an antenna array implemented by arraying multi-band antennas having at least one different operating band. For example, the antenna array may be implemented with a first multi-band antenna 900 and a second multi-band antenna 950. The first multi-band antenna 900 and the second multi-band antenna 950 are the same type of antennas. The first multi-band antenna 900 and the second multi-band antenna 950 must have at least one identical resonant frequency.

By configuring an antenna array including a multi-band antenna operating at a plurality of wireless communication service bands, beamforming is possible for each band, and a width of a beam to be radiated may be adjusted for each band. When the multi-band antenna is arrayed in the antenna array, antennas having the same operating characteristic and antennas of the same type may be included. According to each operating band, the multi-band antenna may have a random array in which an interval between antennas is not uniform at a specific band.

In FIG. 9, the first multi-band antenna 900 may be a multi-band antenna operating at the band A and the band B, and second multi-band antenna 950 may be a multi-band antenna operating at the band A, the band B, and the band C. Both of the first multi-band antenna 900 and the second multi-band antenna 950 may operate at the band A and the band B. The second multi-band antenna 950 may operate at the band C. It is assumed in FIG. 9 that a beam generated at the band B is generated for only one of the first multi-band antenna 900 and the second multi-band antenna 950.

From the perspective of the band A, an antenna array structure may be formed on the basis of a ULA structure in order to perform sharp beamforming at the band A having the same resonant frequency. From the perspective of the band B and the band C, an array of multi-band antennas operating at the band B and the band C may have a wide antenna interval in comparison with the band A. In addition, from the perspective of the band B and the band C, the number of antennas operating at the band B and the band C may be less than the number of antennas operating at the band A.

That is, the antenna array structure including the multi-band antenna according to the embodiment of the present invention can differently configure an array of the multi-band antenna operating for each band, thereby adjusting a width of a beam generated at a specific band. That is, beamforming can be performed for each band according to a situation by adjusting the width of the beam generated in the multi-band antenna for each band. By configuring the width of the beam formed at a specific band to be wide, it is possible to solve a problem occurring in an NLOS environment in which it is difficult to establish a link between a UE and a BS and in which a channel computation amount to be fed back by the UE to the BS becomes very complex. In addition, it is also possible to solve a problem occurring in the NLOS environment in which the UE easily enters a null state when the BS forms only a beam-formed sharp beam and only the same beamforming is performed for each band.

Figure 10:
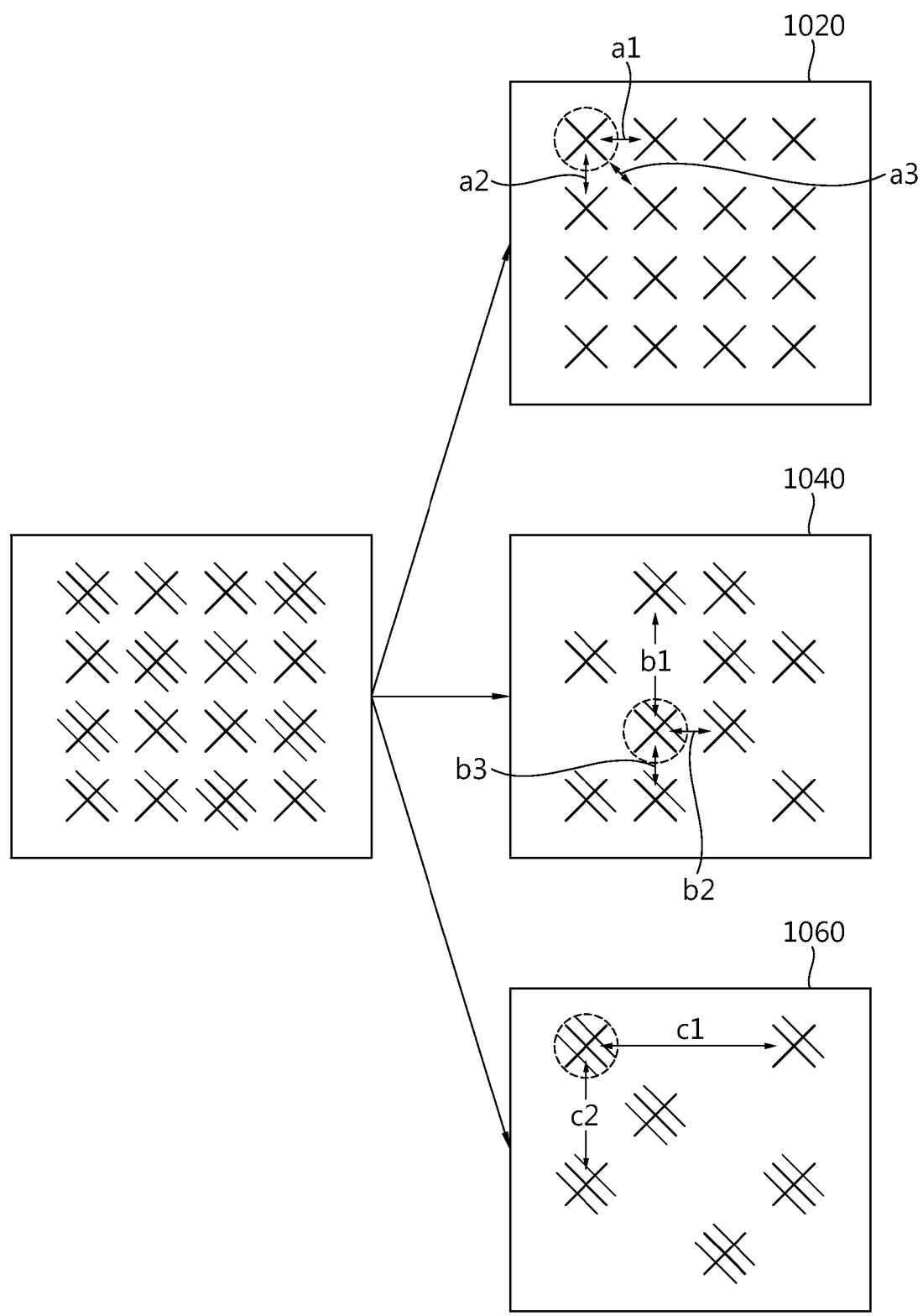
FIG. 10 shows the concept of an array of antennas in an antenna array according to an embodiment of the present invention.

FIG. 10 shows the concept of an array of antennas in an antenna array according to an embodiment of the present invention.

A multi-band antenna operating for each band in the antenna array of FIG. 9 is shown in FIG. 10. In FIG. 10, in case of a band B, only one of a first multi-band antenna and a second multi-band antenna is assumed as a band in use. For example, in case of the band B, only one of the first multi-band antenna and the second multi-band antenna may form a beam on the basis of switching.

More specifically, a band A 1020 is a band at which both of the first multi-band antenna and the second multi-band antenna operate. Therefore, from the perspective of the band A 1020, the first multi-band antenna and the second multi-band antenna may be arrayed with the same ULA structure having the same interval in the antenna array. That is, at the band A 1020, sharp beamforming can be performed on the basis of an antenna array constructed of a resonant circuit consisting of the same reactance component.

On the other hand, in case of a band B 1040 and a band C 1060, multi-band antennas operating at the respective bands are different from each other, and an interval between the antennas may have an inconstant value. In addition, the number of operating multi-band antennas may be small in comparison with the case of the band A 1020. In this case, an AF value of the antenna array is decreased at the band B 1040 and the band C 1060, sharp beamforming as in the case of the band A 1020 may not be achieved, and a radiation pattern may have a wider beam width than the band A 1020.

In case of the band C 1060, since a smaller number of antennas are arrayed than the number of antennas operating at the band B 1040, the AF value is smaller than an AF value formed at the band C 1060, and thus a wider beam width may be formed than a beam width formed at the band B 1040. For example, an antenna array at the band C 1060 may not overlap with a location of an antenna array operating at the band B 1040. Not all of 16 antennas operate at the band B 1040 and the band C 1060 but only some of the antennas operate, and thus an antenna radiation gain is decreased in comparison with the case of the band A 1020 at which the 16 antennas operate. However, the decreased radiation gain can be compensated for by using an AAS system.

That is, according to the embodiment of the present invention, a beam width can be adjusted for each band by changing the number of antennas operating at multiple bands, an array location, and a resonance order.

Hereinafter, an array of antennas of an antenna array including a multi-band antenna is disclosed in detail according to an embodiment of the present invention.

Figure 11:
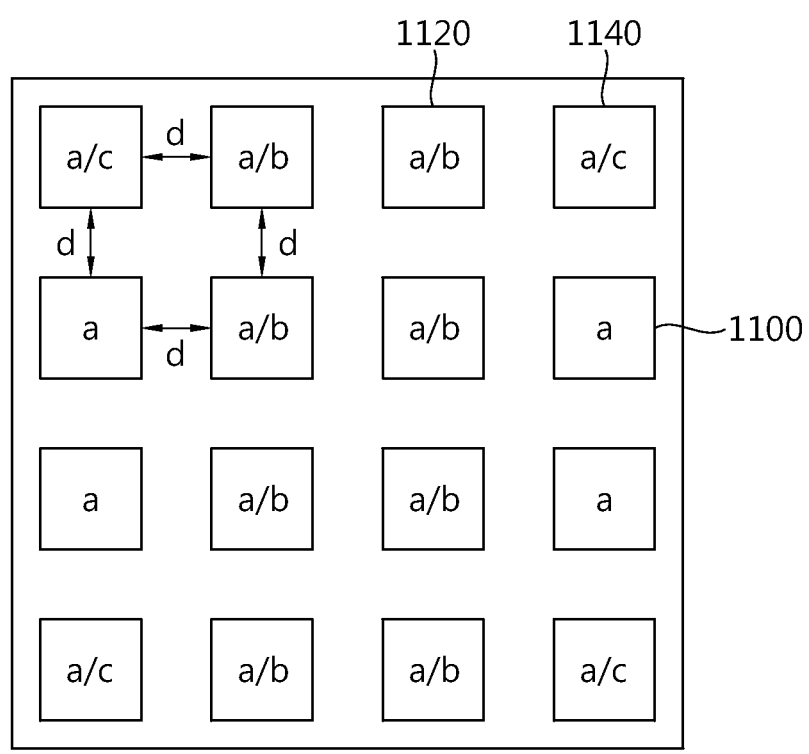
FIG. 11 shows the concept of an antenna array according to an embodiment of the present invention.

FIG. 11 shows the concept of an antenna array according to an embodiment of the present invention.

Referring to FIG. 11, the antenna array may be implemented with a single-band antenna 1100 operating at a band A, a first multi-band antenna 1120 operating at the band A and a band B, and a second multi-band antenna 1140 operating at the band A and a band C.

From a perspective of the band A, all of the single-band antenna 1100, the first multi-band antenna 1120, and the second multi-band antenna 1140 may operate to form a beam pattern.

From a perspective of the band B, the first multi-band antenna 1120 may operate to form a beam pattern.

From a perspective of the band C, the second multi-band antenna 1140 may operate to form a beam pattern.

In comparison with the band A, in case of the band B, a smaller number of antennas may operate to form a beam pattern, and in case of the band C, a smaller number of antennas than the case of the band B may operate with a wide antenna interval.

In this case, as described above, the beam pattern generated at the band B and the band C may have a wider beam pattern than the beam pattern generated at the band A.

An antenna array operating at each of the bands A, B, and C is described with reference to FIG. 12 to FIG. 14.

Figure 12:
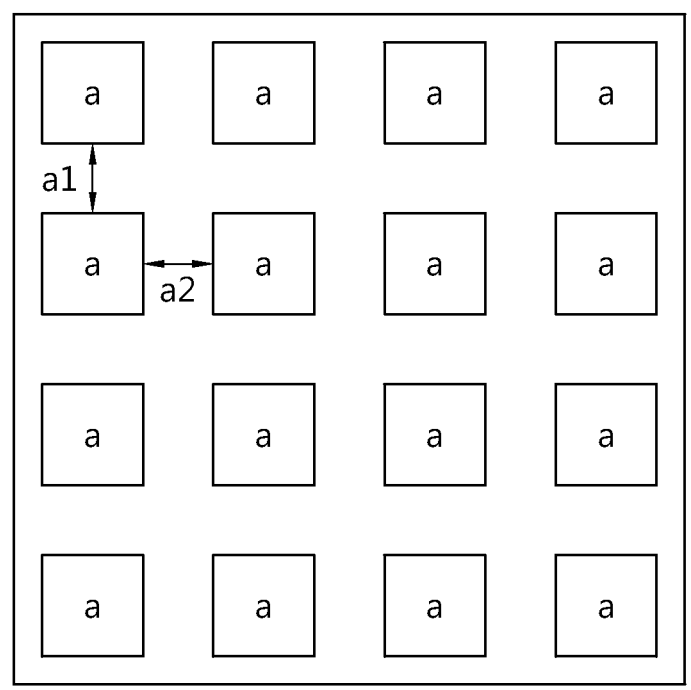
FIG. 12 shows the concept of an array antenna operating at a band A according to an embodiment of the present invention.

FIG. 12 shows the concept of an array antenna operating at a band A according to an embodiment of the present invention.

Referring to FIG. 12, at the band A, all antennas included in a 4×4 antenna array are used to perform beamforming. Among bands A, B, and C, the band A uses a maximum number of antennas in a given structure, and thus may have a value having a smallest HPBW to be formed. An interval between antennas may be implemented to have a length which is half of a wavelength of an operating frequency of the band A. That is, parameters a1, a2, and a3 indicating the interval between antennas may have a value of 0.5λ. For example, if the operating frequency of the antenna operating at the band A is 1.8 GHz, it may have a size of a1=a2=a3=0.5×λ1=83.3 mm (8.3 cm). Herein, λ1 is a wavelength for a case where the operating frequency is 1.8 GHz.

An HPBW may be obtained to 0.111 on the basis of the aforementioned Equation 4.

When an antenna array interval is determined, a visible range of the antenna is determined. The visible range determines a maximum acceptance angle of an area in which a grating lobe is not visible in an AF element formed by the antenna array, and the maximum acceptance angle is 180° (π). An equation for determining the visible range is as shown in Equation 6 below.

$$d_{max} < \frac{\lambda}{1+\sin\theta} \quad \text{(Equation 6)}$$

λ: wavelength

θ: visible (look) range

When the antenna range and the visible range are determined, a scan range of the antenna array may be determined.

Figure 13:
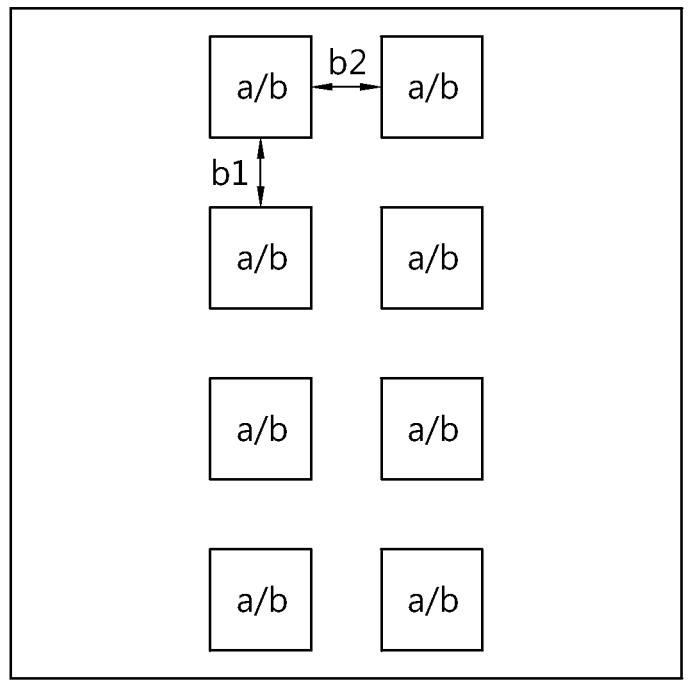
FIG. 13 shows the concept of a multi-band antenna operating also at a band B according to an embodiment of the present invention.

FIG. 13 shows the concept of a multi-band antenna operating also at a band B according to an embodiment of the present invention.

Referring to FIG. 13, a 4×4 antenna is included in an antenna array in practice, but not all antennas operate at the band B. Therefore, an antenna interval (b1, b2) at the band B is described on the basis of only the multi-band antenna operating also at the band B.

The multi-band antenna operating also at the band B may be a multi-band (or multi-resonance) antenna operating at a band A and the band B. The multi-band antenna operating also at the band B must be an antenna having the same type as an antenna operating at the band A, and must be an antenna operating also at the band A and operating also at the band B.

The multi-band antenna may be implemented on the basis of a lower operating frequency among a plurality of operating frequencies at which the multi-band antenna operates. For example, if the band A is 1.8 GHz (e.g., LTE band) and the band B is 900 MHz (e.g., GSM band), the multi-band antenna may be designed in accordance with 900 MHz. An interval between antennas is in proportion to a wavelength. Since the lower the frequency, the longer the wavelength, when the multi-band antenna is designed, it is designed in accordance with an antenna having a long wavelength.

The multi-band antenna operating also at the band B may have an antenna interval of $b1=b2=0.25\lambda 2=83.3$ mm (8.3 cm) when operating at 1.8 GHz (LTE band)/900 MHz (GSM band, legacy communication band). Herein, $\lambda 2$ has a wavelength of 900 MHz. An HPBW may be obtained to 0.443 by using Equation 4.

That is, the antenna operating at the band A and the multi-band antenna operating also at the band B may have the same antenna interval. Although there is a difference in a sense that $a1=a2=0.5\lambda$ and $b1=b2=0.25\lambda$, there is a difficulty in that the multi-band antenna must be designed according to a lower frequency among operating frequencies, and the interval needs to be determined by considering a high frequency.

Since the multi-band antenna operating also at the band B as shown in FIG. 13 must also operate at the band A, this is considered to determine an interval of multi-band antennas operating also at the band B, which results in $b1=b2=0.25\lambda$. That is, since it is $a1=a2=0.5\lambda$ which is the same length as that of the antenna operating at the band A, a 4×4 antenna having an antenna array may operate as a uniform linear array (ULA) when operating at the band A. The multi-band antenna operating also at the band B operates as a 2×8 antenna consisting of 8 antennas, and all of 16 antennas operate at the band B. That is, it may be implemented with a structure in which the number of operating antennas is changed in an antenna array according to a band.

Figure 14:
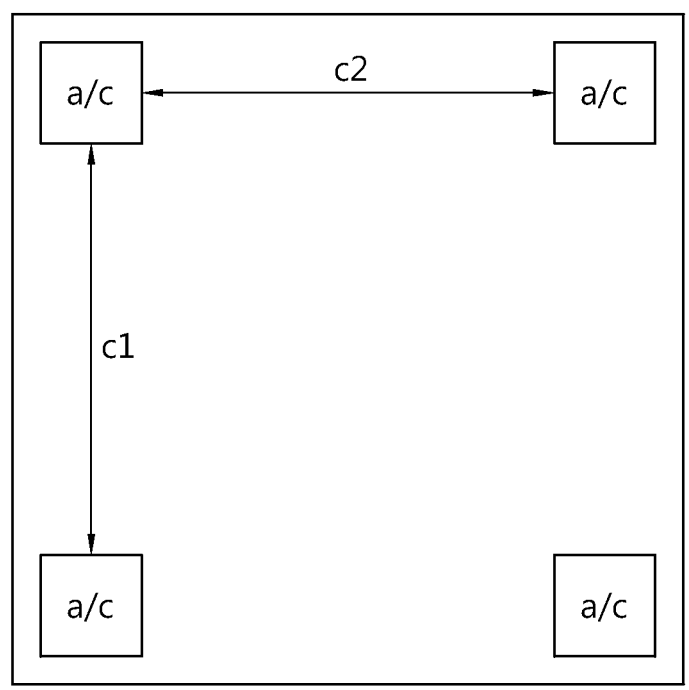
FIG. 14 shows the concept of a multi-band antenna operating also at a band C according to an embodiment of the present invention.

FIG. 14 shows the concept of a multi-band antenna operating also at a band C according to an embodiment of the present invention.

The multi-band antenna operating also at the band C is shown in FIG. 14. The multi-band antenna operating also at the band C is a multi-band (multi-resonance) antenna operating at two operating bands. The multi-band antenna operating also at the band C may be implemented with an array structure of 4 antennas. That is, the multi-band antenna operating also at the band C has an antenna array structure constructed of 4 (2×2) antennas operating as a part of a structure of 16 (4×4) antennas operating at a band A.

The multi-band antenna operating also at the band C must be an antenna operating also at the band A. The multi-band antenna operating also at the band C may be implemented in accordance with a wavelength corresponding to a lower operating frequency between two operating frequencies. In addition, the multi-band antenna operating also at the band C must be the same antenna type as the antenna operating also at the band A. Therefore, 16 antennas included in the antenna array shown in FIG. 11 uses the same antenna type by default.

It may be assumed that the multi-band antenna operating also at the band C operates at the band A (e.g., 1.8 GHz (LTE band)) and the band C (e.g., 700 MHz (emergency broadcast band)). In this case, an interval between antennas operating at the band C may have a value $C1=C2=0.5\lambda 3=214.3$ mm (21.4 cm). Herein, $\lambda 3$ is a wavelength generated at an operating frequency 700 MHz.

If the multi-band antenna operating also at the band C operates at the band A, an interval with respect to the remaining 12 antennas (antenna a, antenna a/b) may be $0.2\lambda 3=85.7$ mm (8.5 cm). An HPBW at the band C may be obtained to 1.108 on the basis of the aforementioned Equation 4.

The multi-band antenna operating also at the band C forms a 2×2 antenna array structure (c1=c2=21.4 cm). When the antenna operates at the band A, it operates as a 16Tx antenna array since the antenna has an antenna interval which is an almost similar to that of the antenna operating at the band A.

That is, in the embodiment of the present invention, it is possible to vary the HPBW for each operating band while maintaining a ULA structure of an n×n antenna (e.g., 4×4 antenna). In order to implement an antenna array for performing radiation with a different beam width for each band, it may be implemented such that an initial antenna interval setup value (e.g., d=a1=a2) is determined and an interval (e.g., (b1, b2), (c2, c2)) of all antennas operating at different bands on the basis of the initial antenna setup value is included in a similar range of the setup value.

Figure 15:
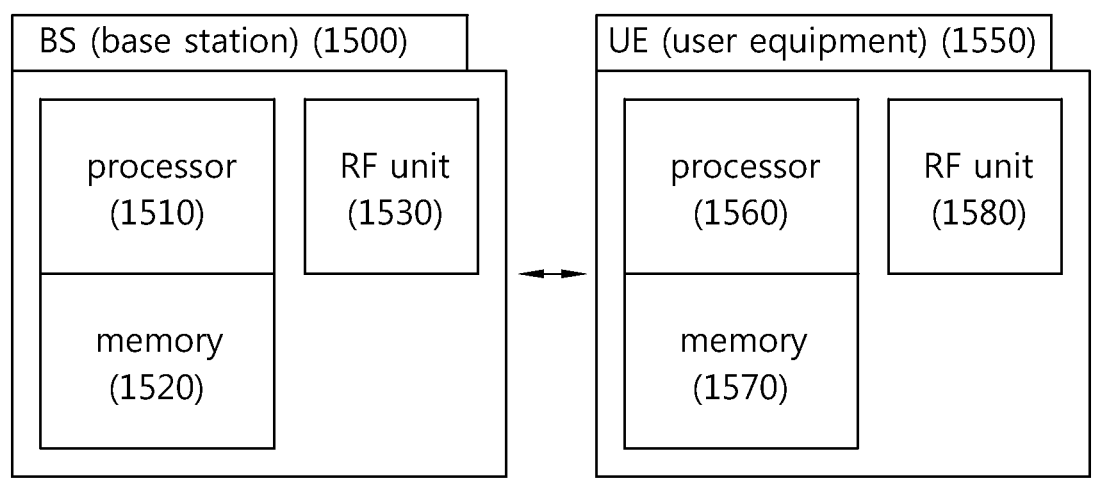
FIG. 15 is a block diagram illustrating a wireless communication system according to an embodiment of the present invention.

FIG. 15 is a block diagram illustrating a wireless communication system according to an embodiment of the present invention.

Referring to FIG. 15, a BS 1500 includes a processor 1510, a memory 1520 and an RF unit 1530. The memory 1520 is connected to the processor 1510 to store various information for driving the processor 1510. The RF unit 1520 is connected to the processor 1510 to transmit and/or receive a wireless signal. The processor 1510 implements the proposed functions, processes and/or methods. In the aforementioned embodiments, an operation of the BS may be implemented by the processor 1510.

For example, a wireless device 1550 includes a processor 1560, a memory 1570 and an RF unit 1580. The memory 1570 is connected to the processor 1560 to store various information for driving the processor 1560. The RF unit 1580 is connected to the processor 1560 to transmit and/or receive a wireless signal. The processor 1560 implements the proposed functions, processes and/or methods. In the aforementioned embodiments, an operation of the wireless device may be implemented by the processor 1560.

For example, the processor 1510 may be implemented to form a first beam pattern on the basis of a single-band antenna set and a multi-band antenna set at a first band in order to perform beamforming in an antenna array. The single-band antenna set may include a plurality of single-band antennas operating only at the first band. The multi-band antenna set may include a plurality of multi-band antennas operating at a plurality of bands including the first band. The antenna array may be arrayed on a 2D plane while maintaining a uniform distance between the plurality of single-band antennas and the plurality of multi-band antennas.

The processor may include an Application-Specific Integrated Circuit (ASIC), other chipsets, a logical circuit and/or a data processing unit. The memory may include a Read Only Memory (ROM), a Random Access Memory (RAM), a flash memory, a memory car and/or other storage units. The RF unit may include a baseband circuit for processing a wireless signal. When the embodiments are implemented by software, the aforementioned techniques may be realized with the modules (processes, functions, etc.) that perform the above-mentioned functions. The modules may be stored in the memory and executed by the processor. The memory may be inside or outside the processor and connected to the processor with well-known various means.

In the aforementioned exemplary systems, the methods are described on the basis of the flowchart as a series of steps or blocks, but the present invention is not limited to the order of the steps, which steps can occur at other stages described above and in a different order or concurrently. In addition, it should be understood to those skilled in the art that the steps shown in the flow chart are not exclusively, or may include other steps, or one or more of the steps of the flowchart may be deleted without affecting the scope of the invention.

What is claimed is:

1. A method of forming of beam in an antenna array, the method comprising:
   forming a first beam pattern based on a single-band antenna set and a multi-band antenna set at a first band; and
   forming a different beam pattern based on the multi-band antenna set at a different band other than the first band,
   wherein the single-band antenna set includes a plurality of single-band antennas operating only at the first band,
   wherein the multi-band antenna set includes a plurality of multi-band antennas operating at a plurality of bands comprising the first band, and
   wherein the antenna array is arrayed in a 2 dimensional (2D) plane while maintaining a uniform distance between the plurality of single-band antennas and the plurality of multi-band antennas.

2. The method of claim 1, wherein the multi-band antenna set includes a first multi-band antenna set and a second multi-band antenna set, and
   wherein the forming of the different beam pattern based on the multi-band antenna set at the different band other than the first band comprises
   forming a second beam pattern based on the first multi-band antenna set at a second band; and
   forming a third beam pattern based on the second multi-band antenna set at a third band.

3. The method of claim 2,
   wherein the first multi-band antenna set comprises a plurality of first multi-band antennas,
   wherein the second multi-band antenna set comprises a plurality of second multi-band antennas, and
   wherein a distance between the plurality of first multi-band antennas is greater than a distance between the plurality of second multi-band antennas.

4. The method of claim 3,
   wherein the first multi-band antenna operates at the first band and the second band, and
   wherein the second multi-band antenna operates at the first band and the third band.

5. The method of claim 4,
   wherein the antenna array has a size of 4×4,
   wherein the single-band antenna, second multi-band antenna, and third multi-band antenna included in the antenna array are arrayed with a specific separation distance from a different antenna nearby,
   wherein the single-band antenna is located at (2, 1), (3, 1), (2, 4), and (3, 4) on the 4×4 antenna array,
   wherein the first multi-band antenna is located at (1, 2), (1, 3), (2, 2), (2, 3), (3, 2), (3, 3), (4, 2), and (4, 3) on the 4×4 antenna array, and
   wherein the second multi-band antenna is located at (1, 1), (1, 4), (4, 1), and (4, 4) on the 4×4 antenna array.

6. A base station operating in a wireless communication network, the base station comprising:
   a radio frequency (RF) unit configured to transmit and receive a radio signal;
   a processor operatively connected to the RF unit and configured to:
   form a first beam pattern based on a single-band antenna set and a multi-band antenna set at a first band; and
   form a different beam pattern based on the multi-band antenna set at a different band other than the first band,
   wherein the single-band antenna set includes a plurality of single-band antennas operating only at the first band,
   wherein the multi-band antenna set includes a plurality of multi-band antennas operating at a plurality of bands comprising the first band, and
   wherein the antenna array is arrayed in a 2 dimensional (2D) plane while maintaining a uniform distance between the plurality of single-band antennas and the plurality of multi-band antennas.

7. The base station of claim 6,
   wherein the processor is configured to:
   form a second beam pattern based on a first multi-band antenna set at a second band, and
   form a third beam pattern based on a second multi-band antenna set at a third band,
   wherein the multi-band antenna set includes the first multi-band antenna set and the second multi-band antenna set.

8. The base station of claim 7,
   wherein the first multi-band antenna set comprises a plurality of first multi-band antennas,
   wherein the second multi-band antenna set comprises a plurality of second multi-band antennas, and
   wherein a distance between the plurality of first multi-band antennas is greater than a distance between the plurality of second multi-band antennas.

9. The base station of claim 8,
   wherein the first multi-band antenna operates at the first band and the second band, and
   wherein the second multi-band antenna operates at the first band and the third band.

10. The base station of claim 9,
    wherein the antenna array has a size of 4×4,
    wherein the single-band antenna, second multi-band antenna, and third multi-band antenna included in the antenna array are arrayed with a specific separation distance from a different antenna nearby,
    wherein the single-band antenna is located at (2, 1), (3, 1), (2, 4), and (3, 4) on the 4×4 antenna array, wherein the first multi-band antenna is located at (1, 2), (1, 3), (2, 2), (2, 3), (3, 2), (3, 3), (4, 2), and (4, 3) on the 4×4 antenna array, and
wherein the second multi-band antenna is located at (1, 1), (1, 4), (4, 1), and (4, 4) on the 4×4 antenna array.

* * * * *